(12) United States Patent
Huang et al.

(10) Patent No.: US 9,301,322 B2
(45) Date of Patent: Mar. 29, 2016

(54) RANDOM ACCESS METHOD, USER EQUIPMENT AND NETWORK EQUIPMENT

(71) Applicant: Huawei Technologies Co., Ltd., Shenzhen, Guangdong (CN)

(72) Inventors: Qufang Huang, Shenzhen (CN); Wei Quan, Shenzhen (CN); Yi Jiang, Shenzhen (CN); Xiaofeng Chen, Shenzhen (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 257 days.

(21) Appl. No.: 13/943,410

(22) Filed: Jul. 16, 2013

(65) Prior Publication Data

US 2013/0308613 A1    Nov. 21, 2013

Related U.S. Application Data

(63) Continuation of application No. PCT/CN2012/070218, filed on Jan. 11, 2012.

(30) Foreign Application Priority Data

Jan. 17, 2011 (CN) .......................... 2011 1 0009895

(51) Int. Cl.
*H04W 84/12* (2009.01)
*H04W 84/18* (2009.01)
(Continued)

(52) U.S. Cl.
CPC ........ *H04W 74/0833* (2013.01); *H04W 74/008* (2013.01); *H04W 74/02* (2013.01)

(58) Field of Classification Search
CPC .. H04W 72/0446; H04W 84/12; H04W 84/18
See application file for complete search history.

(56) References Cited

FOREIGN PATENT DOCUMENTS

| CN | 101406100 A | 4/2009 |
|---|---|---|
| CN | 101772181 A | 7/2010 |

(Continued)

OTHER PUBLICATIONS

"Discussion on RACH triggered by PDCCH order," 3GPP TSG RAN WG2 #70, document R2-102810, agenda item 7.1.2, 3rd Generation Partnership Project, Valbonne, France (May 2010).

(Continued)

*Primary Examiner* — Michael J Moore, Jr.
*Assistant Examiner* — Prenell Jones
(74) *Attorney, Agent, or Firm* — Leydig, Voit & Mayer, Ltd.

(57) ABSTRACT

The present invention provides a random access method, a user equipment and a network equipment. The method comprising: acquiring a random access group scheduling identity, wherein the random access group scheduling identity is shared by user equipments belonging to a first group; receiving control signaling scrambled by the random access group scheduling identity on a PDCCH, and decoding the control signaling according to the random access group scheduling identity; receiving a data packet on a PDSCH according to the decoded control signaling, wherein the data packet comprises indication information used for instructing at least one UE belonging to the first group to perform a random access; and determining that the random access is needed to be performed according to the indication information, and performing the random access. The embodiments of the present invention may save PDCCH resource.

19 Claims, 5 Drawing Sheets

(51) Int. Cl.
*H04W 74/08* (2009.01)
*H04W 74/00* (2009.01)
*H04W 74/02* (2009.01)

(56) References Cited

FOREIGN PATENT DOCUMENTS

| CN | 101909356 A | 12/2010 |
| CN | 101946446 A | 1/2011 |
| EP | 1662709 A1 | 5/2006 |
| EP | 2136592 A1 | 12/2009 |
| WO | WO 2009/131099 A1 | 10/2009 |
| WO | WO 2009/133758 A1 | 11/2009 |
| WO | WO 2010077122 A2 | 7/2010 |

OTHER PUBLICATIONS

International Search Report in corresponding PCT Patent Application No. PCT/CN2012/070218 (Apr. 12, 2012).

Written Opinion of the International Searching Authority in corresponding PCT Patent Application No. PCT/CN2012/070218 (Apr. 12, 2012).

RANDOM ACCESS METHOD, USER EQUIPMENT AND NETWORK EQUIPMENT

CROSS-REFERENCE TO RELATED APPLICATIONS

This application is a continuation of International Patent Application No. PCT/CN2012/070218, filed on Jan. 11, 2012, which claims priority to Chinese Patent Application No. 201110009895.1, filed on Jan. 17, 2011, both of which are hereby incorporated by reference in their entireties.

FIELD OF THE INVENTION

The present invention relates to communication technologies, and particularly, to a random access method, user equipment and network equipment.

BACKGROUND OF THE INVENTION

In a long term evolution (Long Term Evolution, LTE) system, a base station, which may be an eNB, uses a physical downlink control channel (Physical Downlink Control Channel, PDCCH) to transmit control signaling for scheduling a user equipment (User Equipment, UE), and when data of a UE in connected state is scheduled, the control signaling includes a cell radio network temporary identity (Cell Radio Network Temporary Identity, C-RNTI) of the UE, i.e., using C-RNTI of the UE to scramble, and the control signaling includes physical channel resource assigned for the UE and an adopted modulation and coding scheme (Modulation and Coding Scheme, MCS) and so forth. After receiving the control signaling transmitted on the PDCCH, the UE parses relevant information carried in the control signaling, and performs a sending and receiving of data on a corresponding physical channel according to indication thereof.

Control signaling transmitted on the PDCCH, per se, is also carried on certain physical resource for transmitting. Take a cell with a bandwidth of 5 MHz as an example, there are generally more than ten control signalings that may be carried in one transmission time interval (Transmission Time Interval, TTI) including both uplink and downlink scheduling signalings. As a result, when averaged to uplink or downlink, several to about ten users may be scheduled concurrently in one TTI. Further, in some scenarios, in a heterogeneous network for example, in order to reduce interference between cells, control signaling is probably sent only on some subframes. At the moment, number of control signalings transmitted on the PDCCH will be less. As the limited number of control signalings transmitted on PDCCH, number of users that may be scheduled is also limited.

In the prior art, a base station may trigger a UE served by the base station to initiate a random access procedure by sending a PDCCH order (Physical Downlink Control Channel order), wherein the PDCCH order is a kind of control signaling transmitted on the PDCCH. When the UE is in an uplink out-of-sync state, while at the moment, the base station has downlink data of the UE to transmit, the base station may firstly notify the UE by a PDCCH order to perform a random access to acquire uplink synchronization, and then performs downlink data transmission. In this case, after receiving the downlink data, the UE may send a hybrid automatic repeat request (Hybrid Automatic Repeat Request, HARQ) feedback, and a network side optimizes transmission manners according to the feedback.

When multiple UEs lose uplink synchronization, a base station needs the multiple UEs to re-acquire uplink synchronization by random access, and the base station needs to use PDCCH signaling to trigger the multiple UEs to perform random access, which will leads to a great amount of PDCCH signaling overhead.

SUMMARY OF THE INVENTION

The embodiments of the present invention provide a random access method, a user equipment and a network equipment, to solve the problem that a great amount of PDCCH signalings will be caused when multiple UEs lose uplink synchronization and a base station needs to use PDCCH signalings to trigger the multiple UEs to perform a random access.

According to the first aspect of the present invention, a random access method includes:

acquiring a random access group scheduling identity, wherein the random access group scheduling identity is shared by user equipments (UEs) belonging to a first group;

receiving control signaling scrambled by the random access group scheduling identity on a physical downlink control channel (PDCCH), and decoding the control signaling according to the random access group scheduling identity;

receiving a data packet on a physical downlink shared channel (PDSCH) according to the decoded control signaling, wherein the data packet comprises indication information used for instructing at least one UE belonging to the first group to perform a random access; and determining that the random access is needed to be performed according to the indication information, and performing the random access.

According to the second aspect of the present invention, a random access method includes:

sending control signaling scrambled by a random access group scheduling identity to a user equipment (UE) belonging to a first group on a physical downlink control channel (PDCCH), wherein the random access group scheduling identity is shared by user equipments belonging to the first group;

generating a data packet, wherein the data packet comprises indication information used for instructing at least one UE belonging to the first group to perform a random access; and sending the data packet to the UE such that the UE decodes the control signaling according to the random access group scheduling identity, receives the data packet according to decoded control signaling, determines that the random access is needed to be performed and perform the random access.

According to the third aspect of the present invention, a user equipment includes:

an acquiring module, configured to acquire a random access group scheduling identity, wherein the random access group scheduling identity is shared by user equipments (UEs) belonging to a first group;

a decoding module, configured to receive control signaling scrambled by the random access group scheduling identity on a physical downlink control channel (PDCCH), and decode the control signaling according to the random access group scheduling identity;

a receiving module, configured to receive a data packet on a physical downlink shared channel (PDSCH) according to the decoded control signaling, wherein the data packet comprises indication information used for instructing at least one UE belonging to the first group to perform a random access; and a random access module, configured to determine that the random access is needed to be performed according to the indication information, and performing the random access.

According to the fourth aspect of the present invention, a network equipment includes:

a signaling sending module, configured to send control signaling scrambled by a random access group scheduling identity to a user equipment (UE) belonging to a first group on a physical downlink control channel (PDCCH), wherein the random access group scheduling identity is shared by user equipments belonging to the first group;

a generating module, configured to generate a data packet, wherein the data packet comprises indication information used for instructing at least one UE belonging to the first group to perform a random access; and a data sending module, configured to send the data packet to the UE such that the UE decodes the control signaling according to the random access group scheduling identity, receives the data packet according to decoded control signaling, determines that the random access is needed to be performed and perform the random access.

As may be seen from the above-mentioned technical solutions, in the embodiments of the present invention, by comprising random access indication information in a data packet and replacing a PDCCH signaling with the random access indication information, multiple user equipments can be informed of performing a random access, so PDCCH signalings are avoided to be frequently used to instruct user equipments to perform a random access, and PDCCH resource is saved.

BRIEF DESCRIPTION OF THE DRAWINGS

In order to describe the technical solutions in the embodiments of the present invention more clearly, a brief introduction on the drawings needed in the description of the embodiments is given below. Obviously, the drawings in the description below are only some embodiments of the present invention, based on which other drawings may also be obtained by those of ordinary skill in the art without any inventive efforts.

DETAILED DESCRIPTION OF THE EMBODIMENTS

The technical solutions in the embodiments of the present invention are described hereinafter clearly and completely, with reference to accompanying drawings in the embodiments of the present invention. Apparently, the described embodiments are only a part, but not all, of the embodiments of the present invention. All of the other embodiments that are obtained by those of ordinary skill in the art based on the embodiments in the invention without any inventive efforts fall into the scope protected by the present invention.

Figure 1:
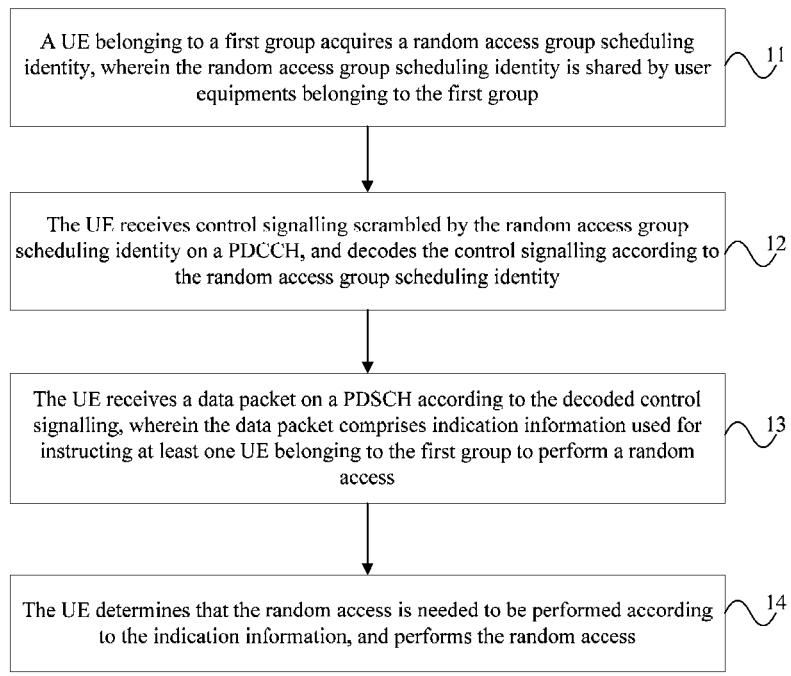
FIG. 1 is a schematic flowchart of a method of a first embodiment of the present invention.

FIG. 1 is a schematic flowchart of a method of a first embodiment of the present invention, comprising the following steps.

Step 11: a UE belonging to a first group acquires a random access group scheduling identity, wherein the random access group scheduling identity is shared by user equipments (UEs) belonging to the first group.

For instance, the UE acquires the random access group scheduling identity by adopting the following manners: receiving a radio resource control (Radio Resource Control, RRC) message sent by a base station, wherein the RRC message carries the random access group scheduling identity assigned for the UEs belonging to the first group; or receiving a paging message sent by the base station, wherein the paging message carries a group identity of the first group, and taking the group identity as the random access group scheduling identity, i.e., taking an identity, i.e. P-RNTI (Paging-Radio Network Temporary Identity, Paging-Radio Network Temporary Identity), corresponding to the paging message as the random access group scheduling identity; or configuring the random access group scheduling identity for the UEs belonging to the first group. Wherein the base station may specifically be a network side entity, such as an eNB, a NodeB and so forth.

Step 12: the UE receives control signaling scrambled by the random access group scheduling identity on a PDCCH, and decodes the control signaling according to the random access group scheduling identity.

Wherein in the embodiments of the present invention, the scrambling is carried out by a scrambler, and the decoding is carried out by a decoder.

Step 13: the UE receives a data packet on a physical downlink shared channel (physical downlink shared channel, PDSCH) according to the decoded control signaling, wherein the data packet comprises indication information used for instructing at least one UE belonging to the first group to perform a random access.

Wherein the data packet may be a media access control (media access control, MAC) protocol data unit (protocol data unit, PDU), and the indication information may be included in a MAC CE of the MAC PDU.

Step 14: the UE determines that the random access is needed to be performed according to the indication information, and performs the random access.

In the present embodiment, multiple UEs are informed of performing a random access by comprising random access indication information in a data packet and replacing the PDCCH signaling with the random access indication information, so PDCCH signalings are avoided to be frequently used to instruct UEs to perform random access, and PDCCH resource is saved.

Figure 2:
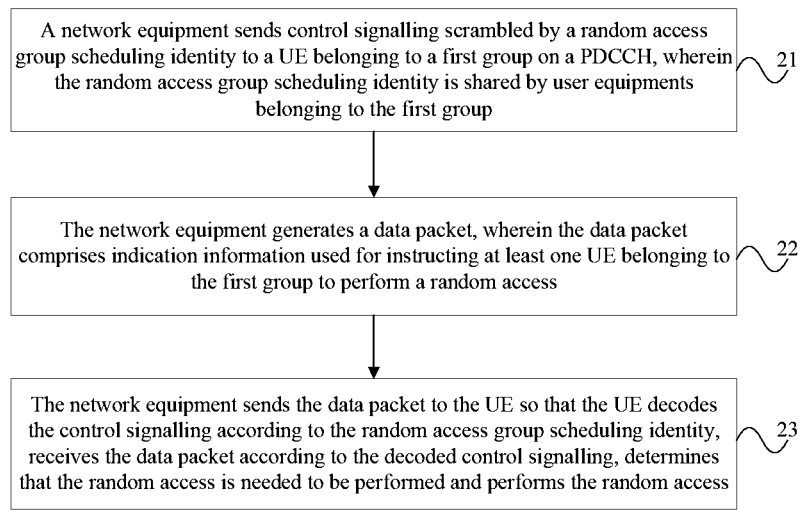
FIG. 2 is a schematic flowchart of a method of a second embodiment of the present invention.

FIG. 2 is a schematic flowchart of a method of a second embodiment of the present invention, comprising the following steps.

Step 21: a network equipment sends control signaling scrambled by a random access group scheduling identity to a UE belonging to a first group on a PDCCH, wherein the random access group scheduling identity is shared by UEs belonging to the first group.

Wherein the network equipment may specifically be a network side entity, such as an eNB, a NodeB and so forth.

Step 22: the network equipment generates a data packet, wherein the data packet comprises indication information used for instructing at least one UE belonging to the first group to perform a random access.

The data packet may specifically be a MAC PDU, and the indication information may be included in a MAC CE of the MAC PDU.

Step 23: the network equipment sends the data packet to the UE such that the UE decodes the control signaling according to the random access group scheduling identity, receives the data packet according to the decoded control signaling, determines that the random access is needed to be performed and performs the random access.

In addition, the present embodiment may also comprise the following steps. The network equipment sends a RRC message to the UE, wherein the RRC message carries the random access group scheduling identity assigned for the UEs belonging to the first group; or, the network equipment sends a paging message to the UE, wherein the paging message carries a group identity of the first group, so that the UE takes the group identity as the random access group scheduling identity.

In the present embodiment, multiple UEs are informed of performing a random access by comprising random access indication information in a data packet and replacing the PDCCH signaling with the random access indication information, so PDCCH signalings are avoided to be frequently used to instruct UEs to perform a random access, and PDCCH resource is saved.

Figure 3:
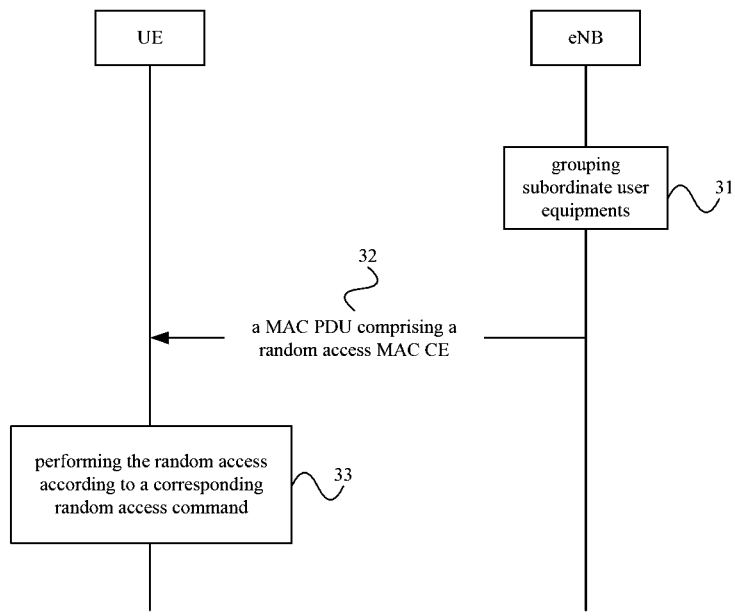
FIG. 3 is a schematic flowchart of a method of a third embodiment of the present invention.

FIG. 3 is a schematic flowchart of a method of a third embodiment of the present invention. The present embodiment takes the data packet being a MAC PDU and the random access indication information being included in a MAC CE as an example, and calls the MAC CE a random access MAC CE. Refers to FIG. 3, the present embodiment comprises the following steps.

Step 31: an eNB groups UEs served by the eNB and being in connected state (i.e. subordinate UEs), and assigns one random access group scheduling identity for each group.

Wherein the eNB may group the subordinate UEs according to at least one item in the following items: a downlink quality condition, a service burst condition and a service characteristics condition. For instance, criteria for the eNB to group the subordinate UEs may be grouping UEs with similar downlink qualities into one group, and may also be grouping UEs with relatively intensive service burst or UEs with similar service characteristics into one group. It should be mentioned that the grouping method actually adopted by the eNB includes, but not limited to, the content described above, it may be an individual one thereof, and may also be a combination of a part of the methods thereof, and so on.

After assigning the group scheduling identity, the eNB may send a RRC message carrying information, such as the group scheduling identity and UE information and so on, to the UE, wherein the UE information may be position information of the UE in a group, a serial number of the UE in the group, or a UE identity.

In addition, in a specific grouping method, if the eNB finds that UEs which have been grouped in one group may no longer be grouped in a same group, then the eNB may regroup the UEs and modify original grouping information via a RRC message.

The RRC message used for notifying grouping information may be an existing RRC message, such as a RRC connection reconfiguration message (RRC Connection Reconfiguration), and may also be a newly added RRC message. While parameters in an existing message, newly added parameters, or certain fields in existing parameters may be used as specific sending parameters for indicating the grouping information.

These RRC messages and indication parameters are adopted names only for convenience of description, and the names may not define the application scope of the embodiments of the present invention, that is to say, there may not be similar names in some systems, however, it may not be thence assumed that the technical solutions in the embodiments of the present invention is not suitable for these systems.

Step 32: the eNB sends a MAC PDU to a UE which needs to perform a random access, wherein the MAC PDU comprises a random access MAC CE belonging to UEs that belong to a same group with the UE, and the random access MAC CE is used for instructing the UE to perform a random access, and schedules the UEs belonging to the same group with one control signaling, wherein the control signaling is scrambled with a SPS group scheduling identity.

Specifically, the MAC PDU may comprise a data packet of the UE that needs a random access and data packets of other UEs belonging to a same group with the UE, wherein the data packet of the UE may be one or multiple MAC CEs; may also be one or multiple MAC PDUs; and may also be one or multiple MAC CEs and one or multiple MAC PDUs.

Wherein the MAC PDU also comprises a MAC PDU sub-header corresponding to the random access MAC CE, wherein the MAC PDU sub-header comprising a logical channel identity (Logical Channel Identity, LCID) field, the LCID field comprises a first value, and the first value is used for indicating that the MAC CE is a MAC CE for instructing at least one UE belonging to the first group to perform a random access. The LCID field may be as shown in table 1.

TABLE 1

| Index | LCID values |
| --- | --- |
| 00000 | CCCH |
| 00001-01010 | Identity of the logical channel |
| 01011-11001 | Reserved |
| 11011 | PDCCH order |
| 11100 | UE Contention Resolution Identity |
| 11101 | Timing Advance Command |
| 11110 | DRX Command |
| 11111 | Padding | where "11011" in the table 1 is a newly added logical channel number used for indicating that a corresponding MAC CE is a random access MAC CE, and specific meanings of other logical channel numbers in the table 1 may be referred to the prior art.

The random access MAC CE may comprise a UE_ID used for indicating the UE that would perform a random access and a corresponding random access command, and the random access command comprises a random access resource and a dedicated random access code. If there is a shortage of the dedicated random access codes, the random access command may also just comprise the random access resource without comprising the dedicated random access code. The UE_ID may be a UE identity, such as a cell radio network temporary identity (Cell Radio network Temporary Identity, C-RNTI), may also be a serial number of the UE in the group, and may also be any one of other identities that may be uniquely identify the UE in the group. Formats of the random access resource and the random access code may be referred to the table 2.

TABLE 2

| Preamble Index (6 bit) | PRACH Mask Index (4 bit) |
|---|---| wherein the "Preamble Index" indicates the random access code and the "PRACH Mask Index" indicates the random access resource.

Figure 4:
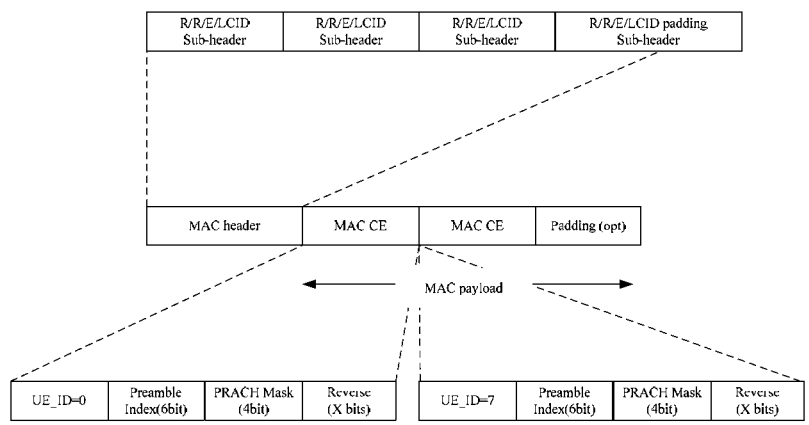
FIG. 4 is a schematic diagram of a structure of format one of a random access MAC CE (Medium Access Control Control Element, Medium Access Control Control Element) in the embodiments of the present invention.
Figure 5:
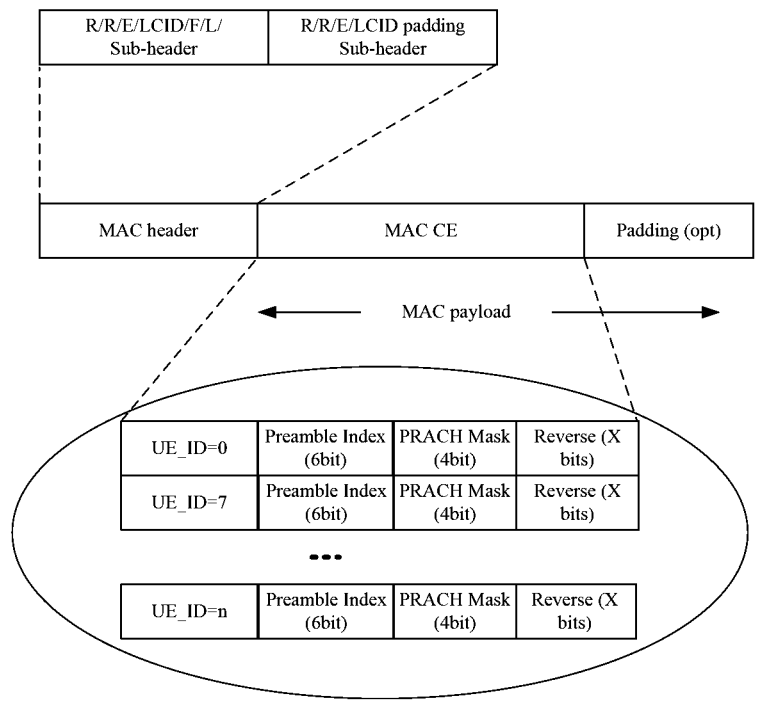
FIG. 5 is a schematic diagram of a structure of format two of the random access MAC CE in the embodiments of the present invention.

A format of the random access MAC CE may be referred to FIG. 4 and FIG. 5.

FIG. 4 is a schematic diagram of a structure of format one of a random access MAC CE in the embodiments of the present invention. In this format, the MAC PDU comprises at least one medium access control control element (MAC CE), and each MAC CE of the at least one MAC CE respectively comprises an identity of a UE that needs to perform the random access and a command for instructing the UE that needs to perform the random access to perform the random access. Specifically, the random access MAC CE in this format has a fixed length. The number of the MAC CEs needs to be the same as the number of the UEs that need to perform the random access, and each MAC CE comprises information of a corresponding UE that needs to perform the random access and a corresponding random access command Referring to FIG. 4, it is assumed that UE_IDs that need to perform the random access are UE_ID=0 and UE_ID=7, respectively.

FIG. 5 is a schematic diagram of a structure of format two of a random access MAC CE in the embodiments of the present invention. In this format, the MAC PDU comprises one MAC CE, wherein the one MAC CE comprises at least one random access unit, and each random access unit of the at least one random access unit respectively comprises an identity of a UE that needs to the perform random access and a command for instructing the UE that needs to perform the random access to perform the random access. Specifically, the random access MAC CE in this format has a variable length. The number of the MAC CEs is one, and the MAC CE comprises the random access unit, wherein the number of the random access units is the same as the number of the UEs that need to perform the random access, and each random access unit comprises information of a corresponding UE that needs to perform the random access and a corresponding random access command Referring to FIG. 5, it is assumed that UE_IDs that need to perform random access are UE_ID=0, and UE_ID=7 UE_ID=n, respectively.

Step 33: the UE performs the random access according to a corresponding random access command if the UE receives a random access MAC CE corresponding with its own.

Specifically, after receiving the PDCCH, the UE uses the random access group scheduling identity acquired in advance to decode the control signaling, obtains the decoded control signaling, and receives a MAC PDU according to the decoded control signaling.

Subsequently, the UE determines whether its own random access MAC CE is included in a received MAC PDU, and after receiving a random access MAC CE belonging to itself, the UE uses a random access code notified by the eNB or randomly chooses a random access code based on a notification of the eNB, and initiate a contention-free or contention-based random access procedure on the random access resource notified by the eNB. A timing to initiate the random access procedure may be after several TTIs when the random access MAC CE is received, and the several TTIs may be configured in advance or configured by a protocol.

In addition, when the UE receives a random access MAC CE belonging to itself in a group scheduled downlink MAC PDU, and if the UE is in an uplink out-of-sync state at present, then even if a network side indicates the UE of performing a feedback, the UE would not perform uplink feedback. When the UE is in an uplink out-of-sync state, the eNB, generally, also knows the information, and therefore, at the moment, the eNB may not indicate the UE of performing an uplink feedback.

In the present embodiment, multiple UEs are informed of performing a random access by comprising random access indication information in a data packet and replacing the PDCCH signaling with the random access indication information, so PDCCH signalings are avoided to be frequently used to instruct UEs to perform the random access, and PDCCH resource is saved.

Figure 6:
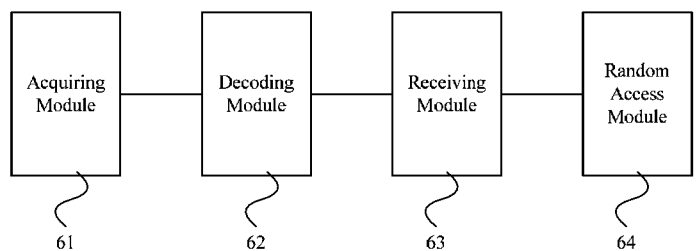
FIG. 6 is a schematic diagram of a structure of a user equipment of a forth embodiment of the present invention.

FIG. 6 is a schematic diagram of a structure of a user equipment of a forth embodiment of the present invention, which comprises an acquiring module 61, a decoding module 62, a receiving module 63 and a random access module 64; wherein the acquiring module 61 is used for acquiring a random access group scheduling identity, and the random access group scheduling identity is shared by user equipments (UEs) belonging to a first group; the decoding module 62 is used for receiving control signaling scrambled by the random access group scheduling identity on a PDCCH, and decoding the control signaling according to the random access group scheduling identity; the receiving module 63 is used for receiving a data packet on a PDSCH according to decoded control signaling, wherein the data packet comprises indication information used for instructing at least one UE belonging to the first group to perform a random access; and the random access module 64 is used for determining that the random access is needed to be performed according to the indication information, and performing the random access.

Wherein the acquiring module 61 may be specifically used for receiving a RRC message sent by a base station, wherein the RRC message carries the random access group scheduling identity assigned for the UEs belonging to the first group; or receiving a paging message sent by the base station, wherein the paging message carries a group identity of the first group, and taking the group identity as the random access group scheduling identity; or configuring the random access group scheduling identity for the UEs belonging to the first group.

The random access module 64 may be specifically used for determining that the random access is needed to be performed according to the indication information, and initiating the random access procedure after a set number of TTIs.

Please refer to the preceding embodiments of a method for details regarding other functions implemented by the user equipment in the present embodiment, and it will not be described herein.

In the present embodiment, multiple UEs are informed of performing a random access by comprising random access indication information in a data packet and replacing the PDCCH signaling with the random access indication information, so PDCCH signalings are avoided to be frequently used to instruct UEs to perform the random access, and PDCCH resource is saved.

Figure 7:
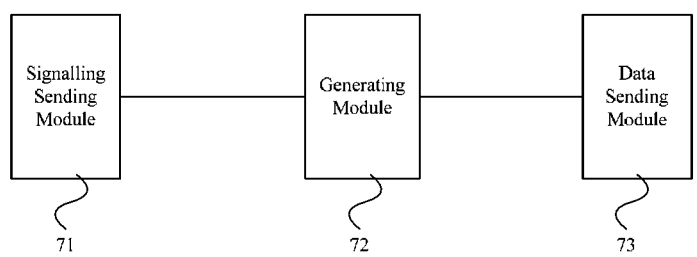
FIG. 7 is a schematic diagram of a structure of a network equipment of the forth embodiment of the present invention.

FIG. 7 is a schematic diagram of a structure of a network equipment of a forth embodiment of the present invention, which comprises a signaling sending module 71, a generating module 72 and a data sending module 73; wherein the signaling sending module 71 is used for sending control signaling scrambled by a random access group scheduling identity to a user equipment UE belonging to a first group on a PDCCH, and the random access group scheduling identity is shared by UEs belonging to the first group; the generating module 72 is used for generating a data packet, wherein the data packet comprises indication information used for instructing at least one UE belonging to the first group to perform a random access; and the data sending module 73 is used for sending the data packet to the UE such that the UE decodes the control signaling according to the random access group scheduling identity, receives the data packet according to decoded control signaling, determines that the random access is needed to perform and performs the random access. The present embodiment may further comprise an identity sending module, for sending a RRC message to the UE, wherein the RRC message carries the random access group scheduling identity assigned for the UEs belonging to the first group; or sending a paging message to the UE, wherein the paging message carries a group identity of the first group, so that the UE takes the group identity as the random access group scheduling identity.

Please refer to the preceding embodiments of a method for details regarding other functions implemented by the network equipment in the present embodiment, and it will not be described herein.

In the present embodiment, multiple UEs are informed of performing a random access by comprising random access indication information in a data packet and replacing the PDCCH signaling with the random access indication information, so PDCCH signalings are avoided to be frequently used to instruct UEs to perform the random access, and PDCCH resource is saved.

It should be appreciated that relevant characteristics in the respective embodiments mentioned above may be referred to each other. In addition, in the above-mentioned embodiments, the terms "first", "second" and so on are used to distinguish the respective embodiments rather than representing a preference of the respective embodiments.

It should be appreciated for those of ordinary skill in the art that all or a part of the procedures in the above-mentioned embodiments of a method may be implemented with a computer program instructing corresponding hardware. The above-mentioned program may be stored in a computer readable storage medium. The procedures of the embodiments of the respective methods mentioned above may be included when the program is executed; and the above-mentioned storage medium includes various kinds of medium that may store program codes, such as a disk, an optical disk, a read-only memory (ROM: Read-Only Memory) or a random access memory (RAM: Random Access Memory) or the like.

In the end, It should be mentioned that the preceding embodiments are only used to illustrate the technical solutions of the present invention rather than limiting the present invention; though the present invention is illustrated in detail by referring to the preceding embodiments, it should be understood by those of ordinary skill in the art that modifications may still be made on the technical solutions disclosed in the preceding respective embodiments, or equivalent alterations may be made to a part of technical characteristics thereof; and these modifications or alterations do not make the nature of corresponding technical solutions departure from the spirit and scope of the technical solutions of the respective embodiments of the present invention.

What is claimed is:

1. A random access method, comprising:
   acquiring a random access group scheduling identity, wherein the random access group scheduling identity is shared by user equipments (UEs) belonging to a first group;
   receiving control signaling scrambled by the random access group scheduling identity on a physical downlink control channel (PDCCH), and decoding the control signaling according to the random access group scheduling identity;
   receiving a data packet on a physical downlink shared channel (PDSCH) according to the decoded control signaling, wherein the data packet comprises indication information used for instructing at least one UE belonging to the first group to perform a random access; and
   determining that the random access is needed to be performed according to the indication information, and performing the random access.

2. The method of claim 1, wherein the data packet comprises a media access control protocol data unit (MAC PDU).

3. The method of claim 1, wherein the acquiring the random access group scheduling identity comprises:
   receiving a radio resource control (RRC) message sent by a base station, wherein the RRC message carries the random access group scheduling identity assigned for the UEs belonging to the first group.

4. The method of claim 1, wherein the acquiring the random access group scheduling identity comprises:
   receiving a paging message sent by the base station, wherein the paging message carries a group identity of the first group, and taking the group identity as the random access group scheduling identity.

5. The method of claim 1, wherein the acquiring the random access group scheduling identity comprises:
   configuring the random access group scheduling identity for the UEs belonging to the first group.

6. The method of claim 1, wherein the determining that the random access is needed to be performed according to the indication information and performing the random access comprises:
   determining that the random access is needed to be performed according to the indication information, and initiating a random access procedure after a set quantity of transmission time intervals (TTIs).

7. The method of claim 2, wherein the MAC PDU comprises at least one MAC CE and a MAC PDU sub-header, wherein the MAC PDU sub-header comprises a logical channel identity (LCID) field, the LCID field comprises a first value, and the first value is used for indicating that the MAC CE is for instructing the at least one UE belonging to the first group to perform random access.

8. The method of claim 2, wherein
   the MAC PDU comprises at least one medium access control control element (MAC CE), wherein each MAC CE of the at least one MAC CE respectively comprises an identity of a UE that needs to perform the random access and a command for instructing the UE to perform the random access.

9. The method of claim 2, wherein
   the MAC PDU comprises one medium access control control element (MAC CE), wherein the one MAC CE comprises at least one random access unit, and each random access unit of the at least one random access unit respectively comprises an identity of a UE that needs to perform the random access and a command for instructing the UE to perform the random access.

10. A random access method, comprising:
    sending control signaling scrambled by a random access group scheduling identity to at least one user equipment (UE) belonging to a first group on a physical downlink control channel (PDCCH), wherein the random access group scheduling identity is shared by user equipments belonging to the first group;

generating a data packet, wherein the data packet comprises indication information used for instructing the at least one UE belonging to the first group to perform a random access; and sending the data packet to the at least one UE so that the at least one UE decodes the control signaling according to the random access group scheduling identity, receives the data packet according to the decoded control signaling, determines that the random access is needed to be performed and performs the random access.

11. The method of claim 10, further comprising:

sending a radio resource control (RRC) message to the at least one UE, wherein the RRC message carries the random access group scheduling identity assigned for the user equipments belonging to the first group.

12. The method of claim 10, further comprising:

sending a paging message to the at least one UE, wherein the paging message carries a group identity of the first group, so that the at least one UE takes the group identity as the random access group scheduling identity.

13. The method of claim 10, wherein the random access group scheduling identity is shared by the at least one UE belonging to the first group.

14. A user equipment, comprising:

a non-transitory computer readable medium including computer-executable instructions for execution on a processor, such that when the computer-executable instructions are executed by the processor a method is carried out comprising:

acquiring a random access group scheduling identity, wherein the random access group scheduling identity is shared by user equipments (UEs) belonging to a first group;

receiving control signaling scrambled by the random access group scheduling identity on a physical downlink control channel (PDCCH), and decoding the control signaling according to the random access group scheduling identity;

receiving a data packet on a physical downlink shared channel (PDSCH) according to the control signaling, wherein the data packet comprises indication information used for instructing at least one UE belonging to the first group to perform a random access; and determining that the random access is needed to be performed according to the indication information, and performing the random access.

15. The user equipment of claim 14, wherein:

the computer readable medium further includes instructions for at least one of: module is configured to implement one of the following:

(a) receiving a radio resource control (RRC) message sent by a base station, wherein the RRC message carries the random access group scheduling identity assigned for the UEs belonging to the first group;

(b) receiving a paging message sent by the base station, wherein the paging message carries a group identity of the first group, and taking the group identity as the random access group scheduling identity; and (c) configuring the random access group scheduling identity for the UEs belonging to the first group.

16. The equipment of claim 14, wherein the computer readable medium further includes instructions for determining that the random access is needed to be performed according to the indication information, and initiating a random access procedure after a set quantity of transmission time intervals (TTIs).

17. A network equipment, comprising:

a non-transitory computer readable medium including computer-executable instructions for execution on a processor, such that when the computer-executable instructions are executed by the processor a method is carried out comprising:

sending control signaling scrambled by a random access group scheduling identity to at least one user equipment (UE) belonging to a first group on a physical downlink control channel (PDCCH), wherein the random access group scheduling identity is shared by user equipments belonging to the first group;

generating a data packet, wherein the data packet comprises indication information used for instructing the at least one UE belonging to the first group to perform a random access; and sending the data packet to the at least one UE, so that the at least one UE decodes the control signaling according to the random access group scheduling identity, receives the data packet according to the decoded control signaling, determines that the random access is needed to be performed and performs the random access.

18. The equipment of claim 17, wherein the computer readable medium further includes instructions for sending one of the following message to the at least one UE: a radio resource control (RRC) message and a paging message, wherein the RRC message carries the random access group scheduling identity assigned for the user equipments belonging to the first group; wherein the paging message carries a group identity of the first group, so that the at least one UE takes the group identity as the random access group scheduling identity.

19. The equipment of claim 17, wherein the random access group scheduling identity is shared by the at least one UE belonging to the first group.

* * * * *